United States Patent
Tanishita

(10) Patent No.: US 6,221,526 B1
(45) Date of Patent: Apr. 24, 2001

(54) AUXILIARY POWER SOURCE DEVICE FOR PORTABLE ELECTRONIC INSTRUMENT

(75) Inventor: Isamu Tanishita, Shizuoka-ken (JP)

(73) Assignee: Tanishita Industries Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/262,294

(22) Filed: Mar. 4, 1999

(30) Foreign Application Priority Data

Jul. 28, 1998 (JP) .................................................. 10-212236
Dec. 25, 1998 (JP) .................................................. 10-368364

(51) Int. Cl.[7] .......................... H01M 10/38; H01M 2/10; H01M 2/02
(52) U.S. Cl. ........................ 429/123; 429/96; 429/97; 429/121; 429/178; 429/179
(58) Field of Search ................................ 429/96, 97, 123, 429/179, 121, 178

(56) References Cited

U.S. PATENT DOCUMENTS

| | | | |
|---|---|---|---|
| 4,469,765 | * | 9/1984 | McCartney et al. .................. 429/123 |
| 5,432,025 | * | 7/1995 | Cox ......................................... 429/65 |
| 5,434,018 | * | 7/1995 | Sasaki et al. .......................... 429/100 |
| 5,663,012 | * | 9/1997 | Shannon et al. ...................... 429/121 |
| 5,843,595 | * | 12/1998 | Kawakatsu ............................. 429/97 |

* cited by examiner

Primary Examiner—Nam Nguyen
Assistant Examiner—Steven H. Ver Steeg
(74) Attorney, Agent, or Firm—Kanesaka & Takeuchi

(57) ABSTRACT

An auxiliary power source device for a portable electronic instrument is formed of a main body, an attaching terminal disposed, at one side of the main body, which is detachably fitted into an external connection terminal of the portable electronic instrument to provide electricity to the same, a battery disposed in the main body and connected to the attaching terminal, and an elastic engaging member disposed at a side portion of the attaching terminal. When the attaching terminal is fitted into the external connection terminal, the engaging member is engaged with an inner wall of the external connection terminal by an elastic force of the engaging member. In case a battery of the portable electronic instrument is dead, the auxiliary power source device can be securely connected to the portable electronic instrument by an easy operation, so that the battery of the portable electronic instrument can be charged, or the portable electronic instrument can be used immediately. Also, the auxiliary power source device can be detached easily after use.

6 Claims, 3 Drawing Sheets

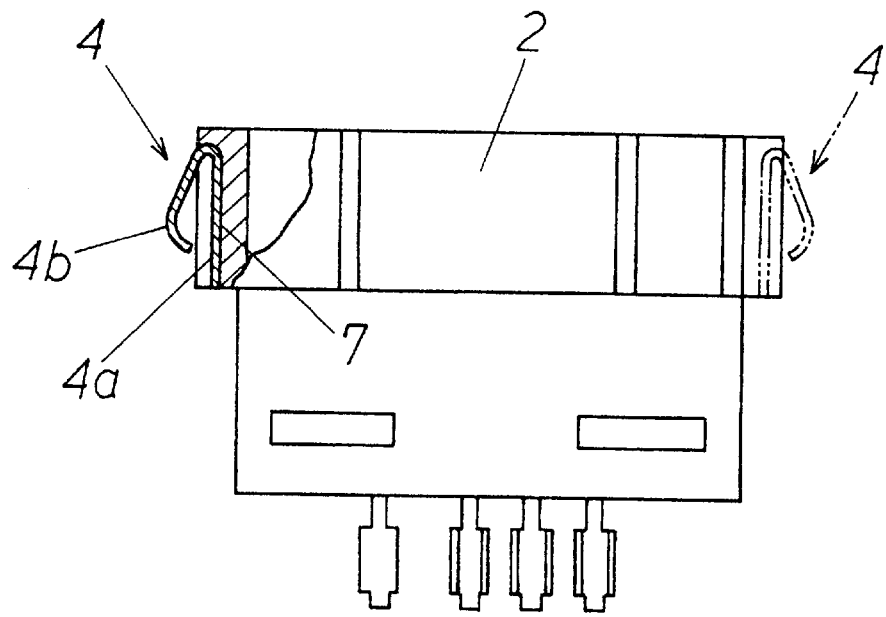
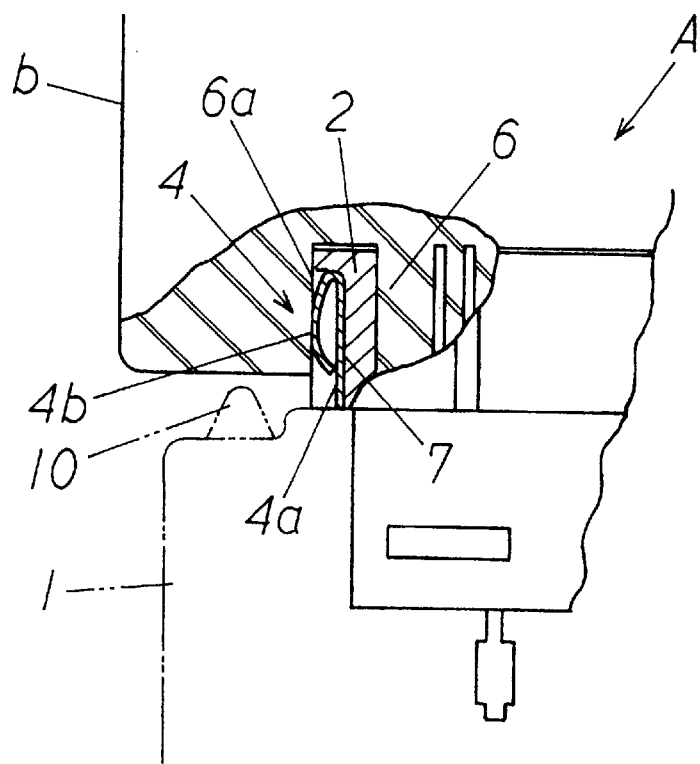

AUXILIARY POWER SOURCE DEVICE FOR PORTABLE ELECTRONIC INSTRUMENT

BACKGROUND OF THE INVENTION AND RELATED ART STATEMENT

The present invention relates to an auxiliary power source device for a portable electronic instrument, which is securely and easily connected to the portable electronic instrument when a battery of the portable electronic instrument becomes weak or dead, so that the built-in battery of the portable electronic instrument can be charged, or the portable electronic instrument can be operated immediately by electricity of the auxiliary power source.

A portable phone or the like is prevailing rapidly. When using the portable phone frequently, consumption of a built-in battery thereof is quick, so that the battery becomes dead in a short time. Therefore, as a precaution, a portable type simple charger 50 as shown in FIG. 5 is available in the market.

In the charger 50, a connector 54 fitted into an external connection terminal 53 of a portable phone 52 is disposed at one side of a case 51, and a battery 55 which supplies electricity to the connector 54 is provided at the other side of the case 51.

And, the case 51 is provided with lock metal fittings 56 for preventing the connector 54 from disengaging easily when the connector 54 is fitted into the external connection terminal 53. When the connector 54 is inserted, the lock metal fittings 56 are bent inwardly and expanded again by a spring action so as to engage with engaging step portions 57.

When the charger 50 is detached from the portable phone 52, push buttons 58 disposed at the lock metal fittings 56 are pushed in the directions shown by arrows in FIG. 5, so that the locking is released, and the charger 50 can be pulled out.

However, the charger 50 has the following problems. Namely, whenever the charger 50 is detached from the portable phone 52, operation of pushing the push buttons 58 has to be carried out; and if a user forgets to push the push buttons 58 or mistakenly pulls out the charger 50 by force, the external connection terminal 53 of the portable phone 52 might be broken.

Especially, since the entire charger 50 has a comparatively large structure as compared to the portable phone 52 which has been miniaturized, the charger is not well fitted or installed when the charger is connected. Also, the charger is inconvenient because it is too large for carrying in case of emergency.

Also, a mechanism for locking is complicated to thereby increase cost of a product itself, resulting in failing to provide the products at a low price in the market.

The present invention has been made in view of the aforementioned problems, and an object of the invention is to provide an auxiliary power source device for a portable electronic instrument, which can be connected securely by a simple operation to the portable electronic instrument when the portable electronic instrument is out of battery so as to charge the portable electronic instrument or to immediately use the same.

Another object of the present invention is to provide an auxiliary power source device for a portable electronic instrument as mentioned above, wherein the auxiliary power source device can also be detached easily.

Further objects and advantages of the invention will be apparent from the following description of the invention.

SUMMARY OF THE INVENTION

To achieve the above objects, the present invention provides an auxiliary power source device for a portable electronic instrument, which is formed of a main body; an attaching terminal which is disposed to project at one side of the main body and freely detachably fitted into an external connection terminal in the portable electronic instrument to provide electricity to the same; a battery connected to the attaching terminal and disposed in the main body; and an engaging member disposed at a side portion of the attaching terminal. The engaging member has elasticity, so that when the attaching terminal is fitted into the external connection terminal, the engaging member engages an inner wall of the external connection terminal.

Also, the present invention provides an auxiliary power source device for a portable electronic instrument, which is formed of a main body; an attaching terminal which is disposed to project at one side of the main body and detachably fitted into an external connection terminal of the portable electronic instrument to provide electricity to the same, the attaching terminal having a concave groove at a side thereof; a battery connected to the attaching terminal and disposed in the main body; and an engaging member having elasticity and disposed to project outwardly from the concave groove. When the attaching terminal is fitted into the external connection terminal, a projecting amount of the engaging member projecting from the concave groove is decreased by virtue of elasticity of the engaging member, so that the engaging member is engaged with and held at the inner wall of the external connection terminal.

Further, the engaging member is disposed to be able to project from and retract in the concave groove. When the attaching terminal is fitted into the external connection terminal, the engaging member retracts into the concave groove and engages the inner wall of the external connection terminal.

Further, the auxiliary power source device includes a luminous member disposed at an adequate portion of an exterior of the main body and connected to the battery, and a switch connected between the luminous member and the battery.

BRIEF DESCRIPTION OF THE DRAWINGS

FIG. 3 is a partly cut front view of the main part, showing a condition that the engaging member in FIG. 1 is attached;

FIG. 4 is a partly cut enlarged view showing the attaching condition of the engaging member in FIG. 3.

DETAILED DESCRIPTION OF PREFERRED EMBODIMENTS

Next, an embodiment of an auxiliary power source device for a portable electronic instrument according to the present invention will be explained with reference to the drawings.

Figure 1:
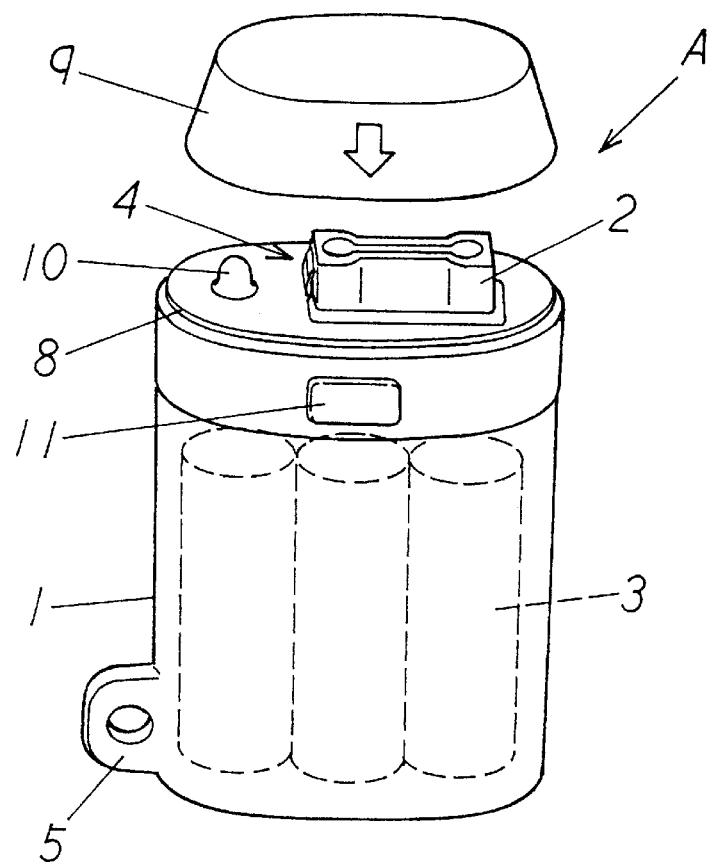
FIG. 1 is a perspective view showing an embodiment of an auxiliary power source device for a portable electronic instrument according to the present invention.

In FIGS. 1 and 4, A designates an auxiliary power source device for a portable electronic instrument, which is carried with or attached to a portable electronic instrument b, such as one used for a mobile computing, portable phone and so on. When a battery, not shown, built in the portable electronic instrument is dead or works poorly, the auxiliary power source device A temporarily charges the battery, or can be used instead of the battery, so that the portable electronic instrument can send or receive a message. The auxiliary power source device A is basically formed of a main body 1, an attaching terminal 2, a battery 3, and an engaging member 4.

And, the main body 1 is formed of a synthetic resin, and in a vicinity of a bottom thereof, there is disposed a hook 5 with which a strap, a ring or the like is engaged.

The attaching terminal 2 is disposed to project at one side, that is, an upper portion of the main body 1, and is fitted into a female-form external connection terminal 6 disposed at a bottom of the portable electronic instrument b to provide electricity to the same. The attaching terminal can be freely attached to the terminal 6 and detached therefrom. The attaching terminal 2 is provided with a terminal portion which provides electricity to a battery built in the portable electronic instrument b, or a terminal portion which provides electricity to an electronic control member (not shown) built in the portable electronic instrument b.

The attaching terminal 2 is formed in a convex shape, that is, a male form, and when the attaching terminal 2 is fitted into the external connection terminal 6 in the female form, they are connected with each other to provide electricity therebetween. The attaching terminal 2 and the external connection terminal 6 are fitted together with a little space therebetween to be connected with each other.

The battery 3 is disposed inside the main body 1, and connected to the attaching terminal 2. Also, a conventional battery, such as a manganese battery or an alkali battery, or a rechargeable battery, is used as the battery 3, and the battery 3 has a voltage corresponding to the battery of the portable electronic instrument b.

If the battery 3 is disposed free-exchangeably in the main body 1, by exchanging with a new battery 3, the main body 1 and the attaching terminal 2 can be used repeatedly. Therefore, it is economical and efficient in view of waste disposal which may cause an environmental problem.

The engaging member 4 is attached to a side portion of the attaching terminal 2, and when the attaching terminal 2 is fitted into the external connection terminal 6 of the portable electronic instrument b, the engaging member 4 engages an inner wall 6a of the external connection terminal 6. The engaging member 4 is formed of metal or a synthetic resin having an elastic force (restoring property such as spring property).

Figure 2A:
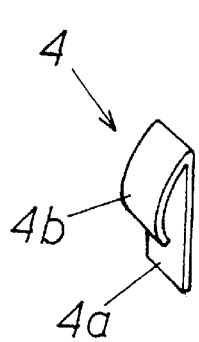
FIGS. 2(a) and 2(b) are perspective views of a main part, showing a condition that an engaging member in FIG. 1 is being attached.
Figure 2B:
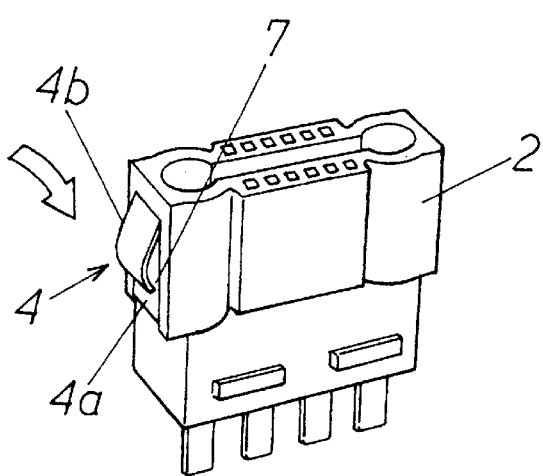
Figure 5:
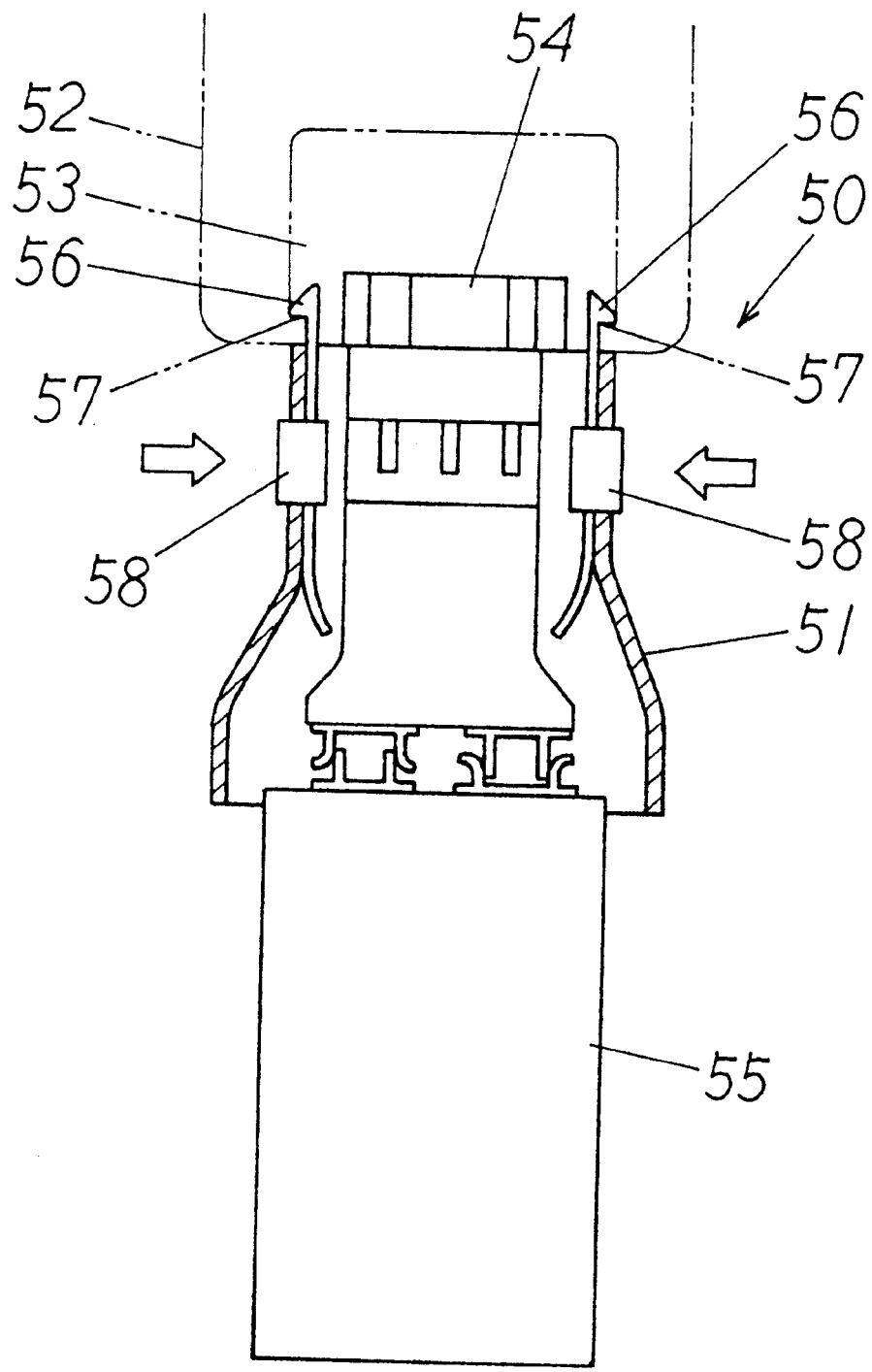
FIG. 5 is a sectional view showing a conventional simple charger.

As shown in FIGS. 2(a), 3 and 4, the engaging member 4 is formed of a base plate 4a fitted into a concave groove 7 of the attaching terminal 2 to abut against the same, and a holding member 4b extending from one end of the base plate 4a and returning in an arch form to be curved inwardly to a side of the base plate 4a, wherein an outer end of the holding member 4b is open to have a free end. The holding member 4b abuts against the inner wall 6a by a predetermined restoring pressing force while the holding member is being bent. In this case, if the holding member 4b abuts in a wide area, the holding power is further improved.

The holding member 4b may be a continuous or loop type member in which an outer end thereof is not open. The holding member 4b with any structure may be used as long as the holding member 4b is bent and abuts against the inner wall 6a by utilizing the restoring force when the holding member 4b is inserted into the inner wall 6a, to thereby prevent the auxiliary power source device A from disengaging.

Incidentally, although an attachment of the base plate 4a of the engaging member 4 to the concave groove 7 can be done by merely pushing the base plate 4a to be fitted to and maintained in the groove 7, if the base plate 4a is fixed by a conventional adhesive or the like, attachment is further secured.

Also, at the upper portion of the main body 1, as shown in FIG. 1, there is disposed a lid 9 fitted into an annular attachment step portion 8. The lid 9 covers members, such as the attaching terminal 2, to protect them.

Further, at an adequate external portion of the main body 1, for example, at the upper portion of the main body 1 near the attaching terminal 2, there is disposed a luminous member 10 connected to the battery 3, and the luminous member 10 and the battery 3 are connected through a switch 11.

As the luminous member 10, a small member, such as a miniature bulb or luminous diode, is embedded, and the luminous member 10 can be used as an illumination not only in case of an operation for fitting into the external connection terminal 6 in a dark place, but also in case of emergency since the auxiliary power source device is carried together with the portable electronic instrument b.

Accordingly, the auxiliary power source device A for the portable electronic instrument structured as described above has the following operations.

In case the battery of the portable electronic instrument b is dead due to consumption of electricity and the portable electronic instrument b is unable to turn on the power, the auxiliary power source device A carried therewith or bought in the nearest shop is taken out, and the attaching terminal 2 thereof is fitted into the external connection terminal 6 of the portable electronic instrument b.

At this time, the holding member 4b of the engaging member 4 attached at the side portions of the attaching terminal 2 abuts against an entrance portion of the inner wall 6a of the external connection terminal 6 and regulated. Thus, the engaging member 4 is bent inwardly along the curve of the holding member 4b and enters the connection terminal.

The holding member 4b abuts against the inner wall 6a with the predetermined pressing force, and the space between the attaching terminal 2 and the external connection terminal 6 is eliminated. Thus, the looseness due to the space is eliminated.

Therefore, the auxiliary power source device A is held at the external connection terminal 6 of the portable electronic instrument b with the predetermined stopping force of the holding member 4b, to thereby exhibit an effect of preventing the attaching terminal 2 from disengagement from the portable electronic instrument.

Accordingly, by the battery 3 provided in the auxiliary power source device A, the battery of the portable electronic instrument b is charged, or the portable electronic instrument b can be immediately used by electricity supplied from the battery 3.

Also, in case of detaching the auxiliary power source device A from the external connection terminal 6 of the portable electronic instrument b, when the main body 1 is pulled outwardly while resisting the pressing force of the holding member 4b of the engaging member 4 with respect to the inner wall 6a of the external connection terminal 6, the holding member 4b slidingly moves along the inner wall 6a to be pulled off. Thus, the auxiliary power source device can be disengaged.

According to the auxiliary power source device A, attaching to the portable electronic instrument b and detaching therefrom can be carried out by one-touch operation of simply inserting and pulling the attaching terminal 2. Also, since the engaging member 4 is disposed at the side portion of the attaching terminal 2, fixing of the auxiliary power source device can be done by simply inserting the attaching terminal 2 into the external connection terminal 6, and other locking mechanisms are not required. Thus, the attachment and detachment can be achieved by a simple structure and simple operation, and breakdown and damage rarely happen.

Further, since the auxiliary power source device A according to the aforementioned structure is made small and has light weight, in case of attaching to the portable electronic instrument b, the auxiliary power source device A and the portable electronic instrument b can be unified with a little supporting force of the engaging member 4.

Incidentally, although the present embodiment shows the auxiliary power source device A wherein the engagement member 4 is disposed on only one side of the attaching terminal 2, it is needless to say that the engaging members 4 can be disposed on both sides of the attaching terminal 2, depending on necessity, as shown by hypothetical lines (two-dotted chain lines) in FIG. 3. In this structure, the attachment to the portable electronic instrument b can be improved.

Also, if the switch 11 disposed in the main body 1 is operated in the dark place, the luminous member 10 of the main body 1 operates, so that predetermined light can be obtained.

Since the present invention structured as described above has a simple structure for engaging with and disengaging from the portable electronic instrument, the entire device can be extremely miniaturized and provided at a low cost in the market. Also, in case that the device is carried with the portable electronic instrument, the device is not cumbersome, and moreover, operations for engaging and disengaging it can be easily carried out.

Further, since the present invention is provided with the luminous member which is disposed at the adequate external portion of the main body and connected to the battery, and the switch connected between the luminous member and the battery, the luminous member may be utilized as a light in case of engaging with and disengaging from the external connection terminal of the portable electronic instrument in the dark place. Additionally, the luminous member may be used as a light in case of emergency because the device is carried with the portable electronic instrument.

While the invention has been explained with reference to the specific embodiments of the invention, the explanation is illustrative and the invention is limited only by the appended claims.

What is claimed is:

1. An auxiliary power source device for a portable electronic instrument, comprising:

a main body, an attaching terminal projecting outwardly from one side of the main body and adapted to be freely detachably fitted into an external connection terminal of the portable electronic instrument to provide electricity to the same, said attaching terminal having an outer side portion, and at least one concave groove formed at the outer side portion of the attaching terminal, a battery disposed in the main body and connected to the attaching terminal, and an engaging member having a base plate with a front end disposed in the at least one concave groove formed at the outer side portion of the attaching, terminal and a holding member attached to the front end of the base plate and disposed over the base plate to have a space at a free end, thereof relative to the base plate, said holding member projecting laterally outwardly from the attaching terminal and having a resiliency so that when the attaching terminal is fitted into the external connection terminal, the holding member decreases a projecting amount from the base plate and engages an inner wall of the external connection terminal by virtue of the resiliency of the engaging member to thereby firmly connect the attaching terminal to the portable electronic instrument.

2. An auxiliary power source device according to claim 1, wherein said engaging member is disposed to be able to project from and retract in the concave groove.

3. An auxiliary power source device according to claim 1, further comprising a luminous member disposed at an exterior of the main body and connected to the battery, and a switch connected between the luminous member and the battery.

4. An auxiliary power source device according to claim 1, wherein two engaging members are provided at side portions of the attaching terminal.

5. An auxiliary power source device according to claim 1, further comprising a cover for detachably covering the attaching terminal disposed at an upper portion of the main body.

6. An auxiliary power source device according to claim 1, wherein said main body has an upper surface, said attaching terminal being smaller than the upper surface of the main body and extending outwardly therefrom, two engaging members being provided at two opposite sides of the attaching terminal so that the auxiliary power source and the portable electronic instrument are fixed together by resiliencies of the holding members of the two engaging members without clamping means.

* * * * *